United States Patent
Ahn et al.

(10) Patent No.: US 9,405,414 B2
(45) Date of Patent: Aug. 2, 2016

(54) METHOD OF SENSING A TOUCH AND TOUCH SENSING SYSTEM

(71) Applicant: SAMSUNG DISPLAY CO., LTD., Yongin, Gyeonggi-Do (KR)

(72) Inventors: Soon-Sung Ahn, Yongin (KR); Joo-Hyeon Jeong, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 154 days.

(21) Appl. No.: 14/097,047

(22) Filed: Dec. 4, 2013

(65) Prior Publication Data

US 2014/0176493 A1 Jun. 26, 2014

(30) Foreign Application Priority Data

Dec. 20, 2012 (KR) .................. 10-2012-0149529

(51) Int. Cl.
*G06F 3/044* (2006.01)
*G06F 3/045* (2006.01)

(52) U.S. Cl.
CPC ............. *G06F 3/044* (2013.01); *G06F 3/045* (2013.01); *G06F 2203/04105* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,883,622 A | * | 3/1999 | Chan et al. | 345/173 |
| 7,649,524 B2 | * | 1/2010 | Haim et al. | 345/173 |
| 7,920,128 B2 | * | 4/2011 | Park et al. | 345/173 |
| 8,963,876 B2 | * | 2/2015 | Lee et al. | 345/174 |
| 2011/0119320 A1 | | 5/2011 | Wu et al. | |
| 2011/0157087 A1 | * | 6/2011 | Kanehira | G06F 3/0414 345/174 |
| 2012/0182235 A1 | | 7/2012 | Lee et al. | |

FOREIGN PATENT DOCUMENTS

| | | |
|---|---|---|
| KR | 10-2009-0061499 A | 6/2009 |
| KR | 10-2011-0075134 A | 7/2011 |
| KR | 10-2012-0083693 A | 7/2012 |

* cited by examiner

*Primary Examiner* — Van Chow
(74) *Attorney, Agent, or Firm* — Lewis Roca Rothgerber Christie LLP

(57) ABSTRACT

A method of sensing a touch is provided, the method including: generating, at a pressure detector, a first sensing signal by detecting a pressure of a touch input by a user; generating, at a position detector, a second sensing signal by detecting a position of the touch input by the user; and removing a noise of the second sensing signal based on the first sensing signal.

20 Claims, 7 Drawing Sheets

LUT

| $|F1[n-1]-F1[n]|$ | A |
|---|---|
| GREATER THAN 30 | 0 |
| GREATER THAN 20 LESS THAN 30 | 0.1 |
| GREATER THAN 10 LESS THAN 20 | 0.5 |
| GREATER THAN 0 LESS THAN 10 | 0.7 |

METHOD OF SENSING A TOUCH AND TOUCH SENSING SYSTEM

CROSS REFERENCE TO RELATED APPLICATION

This application claims priority under 35 U.S.C. §119 to and the benefit of Korean Patent Application No. 10-2012-0149529 filed on Dec. 20, 2012, in the Korean Intellectual Property Office (KIPO), the disclosure of which is hereby incorporated by reference herein in its entirety.

BACKGROUND

1. Field

Example embodiments of the present inventive concept relate to methods of sensing touches.

2. Description of the Related Art

A touchscreen is a display screen having an input device that senses a touch by, for example, a finger of a user or an object (such as a stylus). Recently, as electronic devices have become smaller, a more simple and a more direct input technique for interacting with electronic devices have been desired, and thus, the touchscreen has become widely used as an input/output device of a flat panel display device.

Typically in the touchscreen, a touch panel and a display panel are integrally formed. The touch panel may determine a presence and a position of a touch input by sensing contact by a user. The display panel may be one of various display panels, such as an organic light emitting display (OLED) panel, a liquid crystal display (LCD) panel, a plasma display panel (PDP), a cathode ray tube (CRT) panel, etc.

The touch panel may be classified into a capacitive type touch panel, a resistive film type touch panel, an infrared type touch panel, etc. according to an input sensing manner. A conventional touch panel senses only a single touch. However, a capacitive type touch panel capable of sensing a multi-touch has been recently developed.

The capacitive type touch panel may be classified into a self capacitive type touch panel and a mutual capacitive type touch panel. The self capacitive type touch panel may detect a change in capacitance at each electrode, and the mutual capacitive type touch panel may detect a change in capacitance at each node between two electrodes having an insulator therebetween. The self capacitive type touch panel may sense the touch by measuring a current flowing through the electrode, and the mutual capacitive type touch panel may sense the touch by measuring the capacitance change at each node.

However, the capacitive type touch panel cannot detect a pressure of a touch input by a user or an object. Thus, to allow various types of inputs for the touchscreen, a pressure detecting touchscreen that detects the pressure at the touchscreen has been developed. The pressure detecting touchscreen may be classified into a resistive film type pressure detecting touchscreen and a capacitive type pressure detecting touchscreen.

The capacitive type pressure detecting touchscreen detects the pressure by employing an additional sensor for detecting the pressure on a lower surface of the mutual capacitive type touch panel. By this configuration, the capacitive type pressure detecting touchscreen may detect the pressure at a touched position. Compared with the mutual capacitive type touch panel that detects a position of a touch input, the pressure detecting touchscreen has an advantage that it is relatively insusceptible to noise, but it may not detect an exact position of the touch input.

SUMMARY

Example embodiments provide a method of sensing a touch that removes a noise of a second sensing signal from a position detector unit by using a first sensing signal from a pressure detector unit, thereby increasing a touch response speed and accurately sensing the touch.

Example embodiments provide a non-transitory computer-readable recording medium having embodied thereon a computer program to execute the method of sensing the touch.

Example embodiments provide a touch sensing system performing the method of sensing the touch.

According to one aspect of example embodiments, there may be provided a method of sensing a touch. The method including generating, at a pressure detector, a first sensing signal by detecting a pressure of a touch input by a user; generating, at a position detector, a second sensing signal by detecting a position of the touch input by the user; and removing a noise of the second sensing signal based on the first sensing signal.

The removing the noise of the second sensing signal may include performing a digital filtering operation on the second sensing signal using the first sensing signal.

The performing the digital filtering operation on the second sensing signal may include calculating a filtering coefficient using the first sensing signal; and performing the digital filtering operation on the second sensing signal using the filtering coefficient.

In example embodiments, the performing the digital filtering operation on the second sensing signal may be performed according to the following equation: $F2[n]=(1-A)*I2[n]+A*F2[n-1]$, wherein $F2[n]$ is the second sensing signal of an n-th frame after the digital filtering operation on the second sensing signal of the n-th frame is performed, $I2[n]$ is the second sensing signal of the n-th frame before the digital filtering operation on the second sensing signal of the n-th frame is performed, $F2[n-1]$ is the second sensing signal of an (n−1)-th frame after the digital filtering operation on the second sensing signal of the (n−1)-th frame is performed, and A is a filtering coefficient.

In example embodiments, the filtering coefficient may decrease as a change amount of the first sensing signal increases.

In example embodiments, the filtering coefficient may be calculated according to the following equation: $A=A0+A1*|I1[n-1]-I1[n]|$, wherein A0 is a first constant, A1 is a second negative constant, $I1[n-1]$ is the first sensing signal of the (n−1)-th frame, and $I1[n]$ is the first sensing signal of the n-th frame.

In example embodiments, the filtering coefficient may be calculated according to the following equation: $A=A0+A1*|F1[n-1]-F1[n]|$, wherein A0 is a first constant, A1 is a second negative constant, $F1[n-1]$ is the first sensing signal of the (n−1)-th frame after a digital filtering operation on the first sensing signal of the (n−1)-th frame is performed, and $F1[n]$ is the first sensing signal of the n-th frame after the digital filtering operation on the first sensing signal of the n-th frame is performed.

In example embodiments, the filtering coefficient may be calculated using a look-up table having a plurality of pre-stored filtering coefficients for respective change amounts of the first sensing signal.

According to another aspect of example embodiments, there may be provided a non-transitory computer-readable recording medium having embodied thereon a computer program to execute a method of sensing a touch. The method may include generating, at a pressure detector, a first sensing signal by detecting a pressure of a touch input by a user; generating, at a position detector, a second sensing signal by detecting a position of the touch input by the user; and removing a noise of the second sensing signal based on the first sensing signal.

In example embodiments, a digital filtering operation on the second sensing signal may be performed according to the following equation: $F2[n]=(1-A)*I2[n]+A*F2[n-1]$, wherein $F2[n]$ is the second sensing signal of an n-th frame after the digital filtering operation on the second sensing signal of the n-th frame is performed, $I2[n]$ is the second sensing signal of the n-th frame before the digital filtering operation on the second sensing signal of the n-th frame is performed, $F2[n-1]$ is the second sensing signal of an (n−1)-th frame after the digital filtering operation on the second sensing signal of the (n−1)-th frame is performed, and A is a filtering coefficient, and wherein the filtering coefficient may be calculated using the first sensing signal.

In example embodiments, the filtering coefficient may decrease as a change amount of the first sensing signal increases.

In example embodiments, the filtering coefficient may be calculated according to the following equation: $A=A0+A1*|I1[n-1]-I1[n]|$, wherein A0 is a first constant, A1 is a second negative constant, $I1[n-1]$ is the first sensing signal of the (n−1)-th frame, and $I1[n]$ is the first sensing signal of the n-th frame.

According to still another aspect of example embodiments, there may be provided a touch sensing system including a pressure detector configured to detect a pressure of a touch input by a user and to generate a first sensing signal, a position detector configured to detect a position of the touch input by the user and to generate a second sensing signal, and a filter configured to remove a noise of the second sensing signal based on the first sensing signal.

In example embodiments, the filter may be configured to perform a digital filtering operation on the second sensing signal by using the first sensing signal.

In example embodiments, the filter may be configured to calculate a filtering coefficient by using the first sensing signal, and to perform the digital filtering operation on the second sensing signal by using the filtering coefficient.

In example embodiments, the filter may be configured to perform the digital filtering operation on the second sensing signal according to the following equation: $F2[n]=(1-A)*I2[n]+A*F2[n-1]$, wherein $F2[n]$ is the second sensing signal of an n-th frame after the digital filtering operation on the second sensing signal of the n-th frame is performed, $I2[n]$ is the second sensing signal of the n-th frame before the digital filtering operation on the second sensing signal of the n-th frame is performed, $F2[n-1]$ is the second sensing signal of an (n−1)-th frame after the digital filtering operation on the second sensing signal of the (n−1)-th frame is performed, and A is a filtering coefficient.

In example embodiments, the filtering coefficient may decrease as a change amount of the first sensing signal increases.

In example embodiments, the filter may be configured to calculate the filtering coefficient according to the following equation: $A=A0+A1*|I1[n-1]-I1[n]|$, wherein A0 is a first constant, A1 is a second negative constant, $I1[n-1]$ is the first sensing signal of the (n−1)-th frame, and $I1[n]$ is the first sensing signal of the n-th frame.

In example embodiments, the filter may be configured to calculate the filtering coefficient according to the following equation: $A=A0+A1*|F1[n-1]-F1[n]|$, wherein A0 is a first constant, A1 is a second negative constant, $F1[n-1]$ is the first sensing signal of the (n−1)-th frame after a digital filtering operation on the first sensing signal of the (n−1)-th frame is performed, and $F1[n]$ is the first sensing signal of the n-th frame after the digital filtering operation on the first sensing signal of the n-th frame is performed.

In example embodiments, the filter may include a look-up table having a plurality of pre-stored filtering coefficients for respective change amounts of the first sensing signal, and the filter may be configured to use one of the plurality of pre-stored filtering coefficients in the look-up table.

BRIEF DESCRIPTION OF THE DRAWINGS

Example embodiments can be understood in more detail from the following description taken in conjunction with the accompanying drawings, in which.

DESCRIPTION OF EMBODIMENTS

Figure 1:
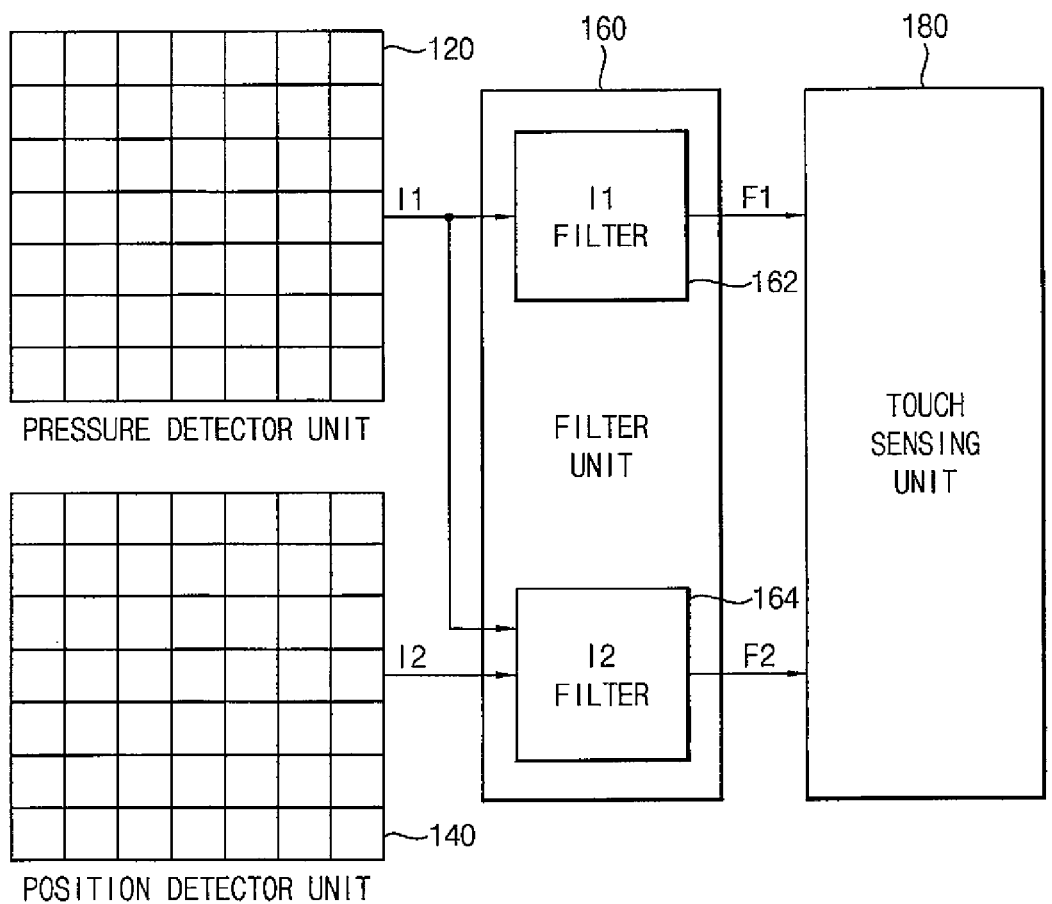
FIG. 1 is a block diagram illustrating a touch sensing system in accordance with example embodiments.

The example embodiments are described more fully hereinafter with reference to the accompanying drawings. The present inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third, etc. may be used herein to describe various elements, components, regions, layers, patterns and/or sections, these elements, components, regions, layers, patterns and/or sections should not be limited by these terms. These terms are only used to distinguish one element, component, region, layer, pattern or section from another element, component, region, layer, pattern or section. Thus, a first element, component, region, layer, pattern or section discussed below could be termed a second element, component, region, layer, pattern or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a touch sensing system in accordance with example embodiments.

Referring to FIG. 1, a touch sensing system 100 includes a pressure detector unit (or pressure detector) 120, a position detector unit (or position detector) 140 and a filter unit (or filter) 160. In some example embodiments, the touch sensing system 100 may further include a touch sensing unit (or touch sensor) 180.

The pressure detector unit 120 may generate a first sensing signal I1 by detecting a pressure of a touch input by a user. According to example embodiments, the pressure detector unit 120 may be a resistive film type pressure detector unit, a capacitive type pressure detector unit, or the like. For example, in the case of the capacitive type pressure detector unit, a sensor for detecting the pressure may be additionally formed as the pressure detector unit 120 on a lower surface of a typical capacitive type touch panel. In this case, the pressure detector unit 120 may detect the pressure at a position of the touch input by using a change in capacitance caused by a deformation (or depression) of the sensor at the position of the touch input. This pressure detector unit 120 may have an advantage that it is relatively insusceptible to noise, but may have a disadvantage in that it may not detect an exact position of the touch input. The first sensing signal I1 may have a voltage value or a current value corresponding to the capacitance at the position of the touch input, and may be provided to the filter unit 160. However, the configuration and the operation of the pressure detector unit 120 described above are provided as examples only, and the present invention is not limited thereto.

The position detector unit 140 may generate a second sensing signal I2 by detecting the position of the touch input by the user. According to example embodiments, the position detector unit 140 may be a capacitive type position detector unit, a resistive film type position detector unit, an infrared light type position detector unit, or the like. For example, in the case of the capacitive type position detector unit, to detect whether the touch input occurs and to detect the position of the touch input, the position detector unit 140 may apply a signal to a first electrode line, may receive the signal through a second electrode line, may amplify a change of the signal caused by a change in capacitance at a node by using a charge amplifier, and may digitize the amplified change by using an analog-to-digital converter (ADC). The second sensing signal I2 may have a voltage value or a current value corresponding to the capacitance at the position of the touch input, and may be provided to the filter unit 160. However, the configuration and the operation of the position detector unit 140 described above are provided as examples only, and the present invention is not limited thereto.

The filter unit 160 may output a first output signal F1 by removing a noise from the first sensing signal I1 generated by the pressure detector unit 120, and may output a second output signal F2 by removing a noise from the second sensing signal I2 generated by the position detector unit 140. The filter unit 160 may include a first sensing signal filter 162 for removing the noise from the first sensing signal I1, and a second sensing signal filter 164 for removing the noise from the second sensing signal I2. The filter unit 160 may remove the noise from the first and second sensing signals I1 and I2 in an analog manner or a digital manner.

In some example embodiments, to remove the noise from the second sensing signal I2, the second sensing signal filter 164 may calculate a filtering coefficient by using the first sensing signal I1, and may perform a digital filtering operation on the second sensing signal I2 by using the calculated filtering coefficient. The digital filtering operation may be performed using a finite impulse response (FIR) filter having stability or using an infinite impulse response (IIR) filter having low hardware complexity. For example, the second sensing signal filter 164 and/or the first sensing signal filter

162 may include the IIR filter that recursively receives its output signal to perform the digital filtering operation.

The second sensing signal filter 164 of the filter unit 160 may perform the digital filtering operation on the second sensing signal I2 by using an equation, "F2[n]=(1−A)*I2[n]+ A*F2[n−1]", where F2[n] is the second sensing signal I2 of an n-th frame after the digital filtering operation on the second sensing signal I2 of the n-th frame is performed, or the second output signal F2 of the n-th frame. I2[n] is the second sensing signal I2 of the n-th frame before the digital filtering operation on the second sensing signal I2 of the n-th frame is performed. F2[n−1] is the second sensing signal I2 of an (n−1)-th frame after the digital filtering operation on the second sensing signal I2 of the (n−1)-th frame is performed, or the second output signal F2 of the (n−1)-th frame. A is the filtering coefficient. The filtering coefficient may be set to a range from about 0 to about 1.

The I2[n], or the second sensing signal I2 of the n-th frame, may include a data component corresponding to a change in capacitance between the (n−1)-th frame and the n-th frame caused by the touch input by the user, and may further include a noise component corresponding to a change in capacitance between the (n−1)-th frame and the n-th frame caused by the noise. In example embodiments, the F2[n−1], or the second sensing signal I2 of the (n−1)-th frame on which the digital filtering operation is performed may not include the change in capacitance caused by the touch input by the user, and may also not include the change in capacitance caused by the noise. Accordingly, if a weighting of the I2[n] for the F2[n] is relatively large, the F2[n] may include a relatively large amount of the data component corresponding to the change in capacitance caused by the touch input by the user, thereby increasing (or improving) a touch response speed. Alternatively, if a weighting of the F2[n−1] for the F2[n] is relatively large, the F2[n] may include a relatively small amount of the noise component corresponding to the change in capacitance caused by the noise, thereby reducing the effect of the noise for the second output signal F2. Thus, as the A, or the filtering coefficient, increases, the weighting of the F2[n−1] may relatively increase, the weighting of the I2[n] may relatively decrease, the effect of the noise for the second output signal F2 may be reduced, and the touch response speed may be reduced because the change caused by the touch input by the user is reflected relatively less. Further, as the A, or the filtering coefficient, decreases, the touch response speed may increase, but the effect of the noise for the second output signal F2 may increase.

The touch sensing system 100 may calculate the filtering coefficient such that the filtering coefficient decreases as a change amount of the first sensing signal I1 (e.g., a difference between the first sensing signal I1 of the (n−1)-th frame and the first sensing signal I1 of the n-th frame) increases. Because the pressure detector unit 120 is relatively insusceptible to noise, the change amount of the first sensing signal I1 may be mainly caused by the touch input by the user. Accordingly, a large change amount of the first sensing signal I1 may mean that the touch input of the user has occurred, and thus a change amount of the second sensing signal I2 as well as the change amount of the first sensing signal I1 may be mainly caused by this touch input by the user. Further, a small change amount of the first sensing signal I1 may mean that the touch input of the user may not have occurred, and thus the change amount of the second sensing signal I2 may be mainly caused by the noise. Accordingly, by decreasing the filtering coefficient as the change amount of the first sensing signal I1 increases, the weighting of the I2[n] for the F2[n] may be increased when the touch input of the user occurs, thereby increasing the touch response speed. Further, by increasing the filtering coefficient as the change amount of the first sensing signal I1 decreases, the weighting of the F2[n−1] for the F2[n] may be increased when the touch input of the user does not occur, thereby decreasing the effect of the noise for the second output signal F2. As described above, whether the change of the second sensing signal I2 is caused by the touch input of the user or by the noise, may be determined by using the change amount of the first sensing signal I1 generated by the pressure detector unit 120, which is insusceptible to the noise. The weightings of the I2[n] and the F2[n−1] for a finding of the F2[n] may be adaptively adjusted based on the determination, thereby increasing the touch response speed and decreasing the effect of the noise.

In some example embodiments, the filter unit 160 may calculate the filtering coefficient by using an equation, "A=A0+A1*|I1[n−1]−I1[n]|", where A0 is a first constant, A1 is a second negative constant, I1[n−1] is the first sensing signal I1 of the (n−1)-th frame, and I1[n] is the first sensing signal I1 of the n-th frame. Because the A1 has a negative value, the A, or the filtering coefficient, may decrease as the change amount of the first sensing signal I1 increases.

The touch sensing unit 180 may receive the first and second output signals F1 and F2 from the filter unit 160, and may determine a coordinate of the position of the touch input and the pressure at the position of the touch input based on the first output signal F1 indicating the pressure at respective coordinates of a touchscreen and the second output signal F2 indicating whether the respective coordinates of the touchscreen are touched.

Figure 2:
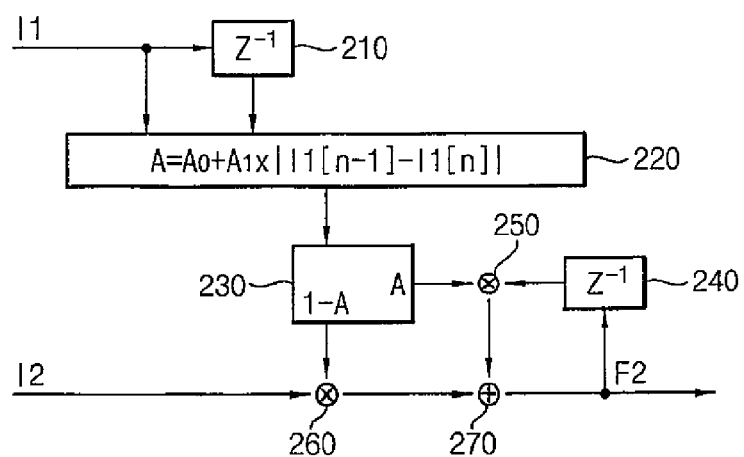
FIG. 2 is a block diagram illustrating an example of a second sensing signal filter included in the touch sensing system of FIG. 1.

FIG. 2 is a block diagram illustrating an example of a second sensing signal filter included in the touch sensing system of FIG. 1.

Referring to FIG. 2, a second sensing signal filter 200 may include a first delay unit (or first delayer) 210, a filtering coefficient calculating unit (or filtering coefficient calculator) 220, a weighting outputting unit (or a weighting outputter) 230, a second delay unit (or second delayer) 240, a first multiplier 250, a second multiplier 260 and an adder 270.

The first delay unit 210 may delay a first sensing signal I1 by one frame. For example, the first delay unit 210 may receive the first sensing signal I1 at an (n−1)-th frame, and may output the first sensing signal I1 of the (n−1)-th frame to the filtering coefficient calculating unit 220 at an n-th frame.

The filtering coefficient calculating unit 220 may calculate a difference between the first sensing signal I1 received from the pressure detector unit 120 illustrated in FIG. 1 and the first sensing signal I1 received from the first delay unit 210 at the n-th frame, may multiply an absolute value of the difference by a negative constant A1, and then may add a constant A0 to a result of the multiplication to calculate the filtering coefficient A.

The weighting outputting unit 230 may output the calculated filtering coefficient A to the first multiplier 250, and may output one minus the calculated filtering coefficient A to the second multiplier 260.

The second delay unit 240 may delay a second output signal F2 by one frame. For example, the second delay unit 240 may receive the second output signal F2 at the (n−1)-th frame, and may output the second output signal F2 of the (n−1)-th frame to the first multiplier 250 at the n-th frame.

The first multiplier 250 may multiply the filtering coefficient A and the second output signal F2 received from the second delay unit 240, and may output a result of the multiplication to the adder 270.

The second multiplier 260 may multiply the value (i.e., one minus the filtering coefficient A) received from the weighting outputting unit 230 and a second sensing signal I2 received from the position detector unit 140 illustrated in FIG. 1, and may output a result of the multiplication to the adder 270.

The adder 270 may add the result of the multiplication of the first multiplier 250 and the result of the multiplication of the second multiplier 260, and may output a result of the addition as the second output signal F2.

According to example embodiments, the second sensing signal filter 200 may be implemented with a hardware device, or may be implemented with a software program.

Figure 3:
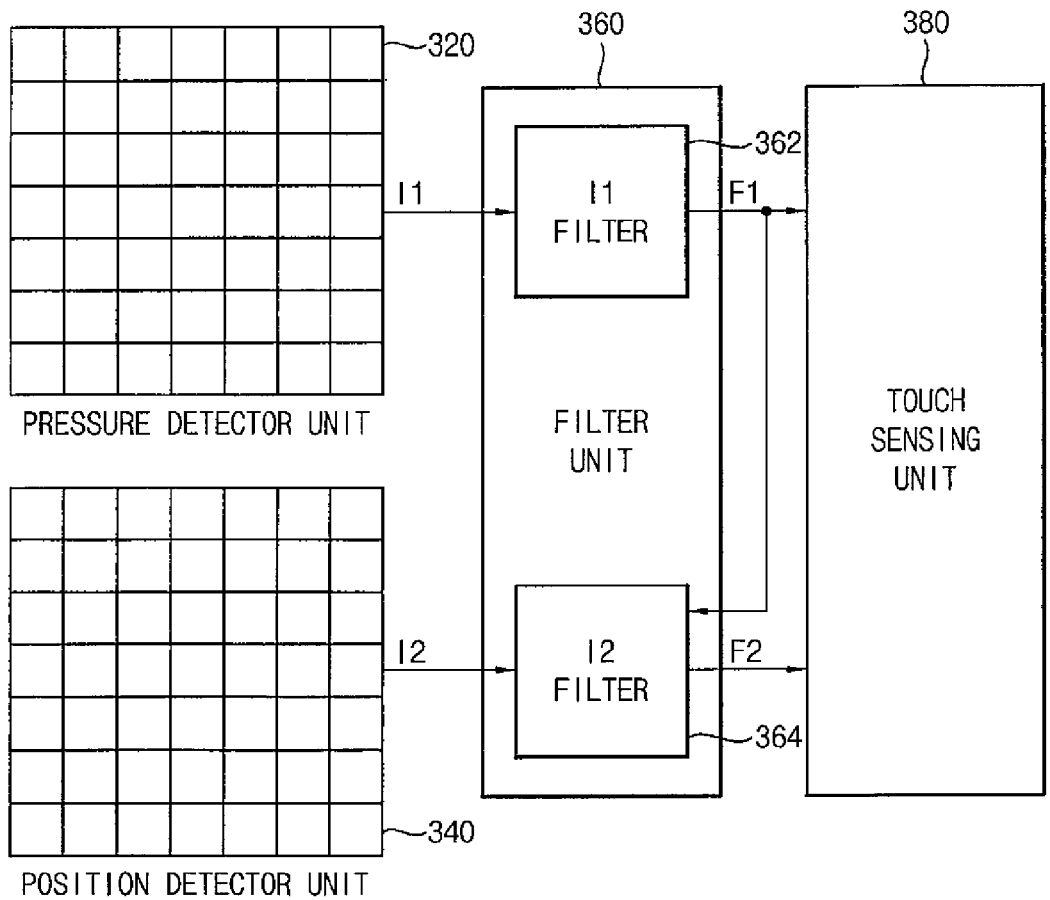
FIG. 3 is a block diagram illustrating a touch sensing system in accordance with example embodiments.

FIG. 3 is a block diagram illustrating a touch sensing system in accordance with example embodiments.

Referring to FIG. 3, a touch sensing system 300 includes a pressure detector unit 320, a position detector unit 340 and a filter unit 360. In some example embodiments, the touch sensing system 300 may further include a touch sensing unit 380. The touch sensing system 300 may have a similar configuration to a touch sensing system 100 of FIG. 1, except for a configuration and a connection of a second sensing signal filter 364 included in the filter unit 360.

The second sensing signal filter 364 of the filter unit 360 may perform a digital filtering operation on a second sensing signal I2.

To calculate a filtering coefficient, unlike a second sensing signal filter 164 illustrated in FIG. 1 using a first sensing signal I1, the second sensing signal filter 364 may use a first output signal F1 where a noise is removed from the first sensing signal I1 by a first sensing signal filter 362. For example, the second sensing signal filter 364 may calculate the filtering coefficient by using an equation, "A=A0+A1*|F1[n−1]−F1 [n]|", where A0 is a first constant, A1 is a second negative constant, F1[n−1] is the first sensing signal I1 of an (n−1)-th frame after a digital filtering operation on the first sensing signal I1 of the (n−1)-th frame is performed (or the first output signal F1 of the (n−1)-th frame), and F1[n] is the first sensing signal I1 of an n-th frame after the digital filtering operation on the first sensing signal of the n-th frame is performed. The second sensing signal filter 364 may calculate the filtering coefficient by using the first output signal F1 where the noise is removed from the first sensing signal I1.

Figure 4:
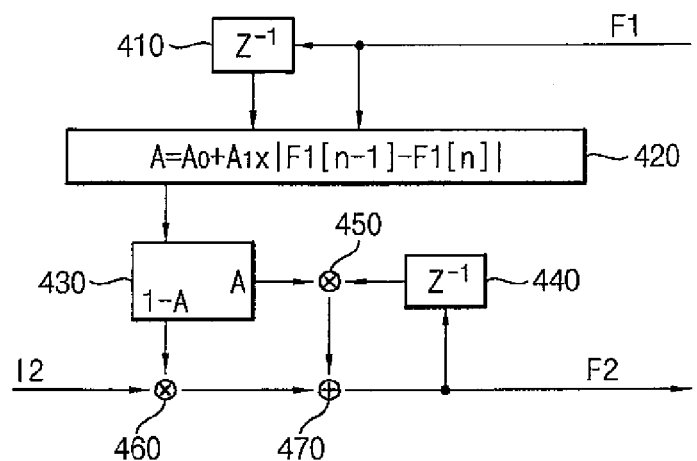
FIG. 4 is a block diagram illustrating an example of a second sensing signal filter included in the touch sensing system of FIG. 3.

FIG. 4 is a block diagram illustrating an example of a second sensing signal filter included in the touch sensing system of FIG. 3.

Referring to FIG. 4, a second sensing signal filter 400 may include a first delay unit 410, a filtering coefficient calculating unit 420, a weighting outputting unit 430, a second delay unit 440, a first multiplier 450, a second multiplier 460 and an adder 470.

The first delay unit 410 may delay a first output signal F1 by one frame. For example, the first delay unit 410 may receive the first output signal F1 at an (n−1)-th frame, and may output the first output signal F1 of the (n−1)-th frame to the filtering coefficient calculating unit 420 at an n-th frame.

The filtering coefficient calculating unit 420 may calculate a difference between the first output signal F1 received from the first sensing signal filter 362 illustrated in FIG. 3 and the first output signal F1 received from the first delay unit 410 at the n-th frame, may multiply an absolute value of the difference by a negative constant A1, and then may add a constant A0 to a result of the multiplication to calculate the filtering coefficient A.

The weighting outputting unit 430 may output the calculated filtering coefficient A to the first multiplier 450, and may output one minus the calculated filtering coefficient A to the second multiplier 460.

The second delay unit 440 may delay a second output signal F2 by one frame. For example, the second delay unit 440 may receive the second output signal F2 at the (n−1)-th frame, and may output the second output signal F2 of the (n−1)-th frame to the first multiplier 450 at the n-th frame.

The first multiplier 450 may multiply the filtering coefficient A and the second output signal F2 received from the second delay unit 440, and may output a result of the multiplication to the adder 470.

The second multiplier 460 may multiply the value (i.e., one minus the filtering coefficient A) received from the weighting outputting unit 430 and a second sensing signal I2 received from the position detector unit 340 illustrated in FIG. 3, and may output a result of the multiplication to the adder 470.

The adder 470 may add the result of the multiplication of the first multiplier 450 and the result of the multiplication of the second multiplier 460, and may output a result of the addition as the second output signal F2.

According to example embodiments, the second sensing signal filter 400 may be implemented with a hardware device, or may be implemented with a software program.

Figures 5A, 5B:
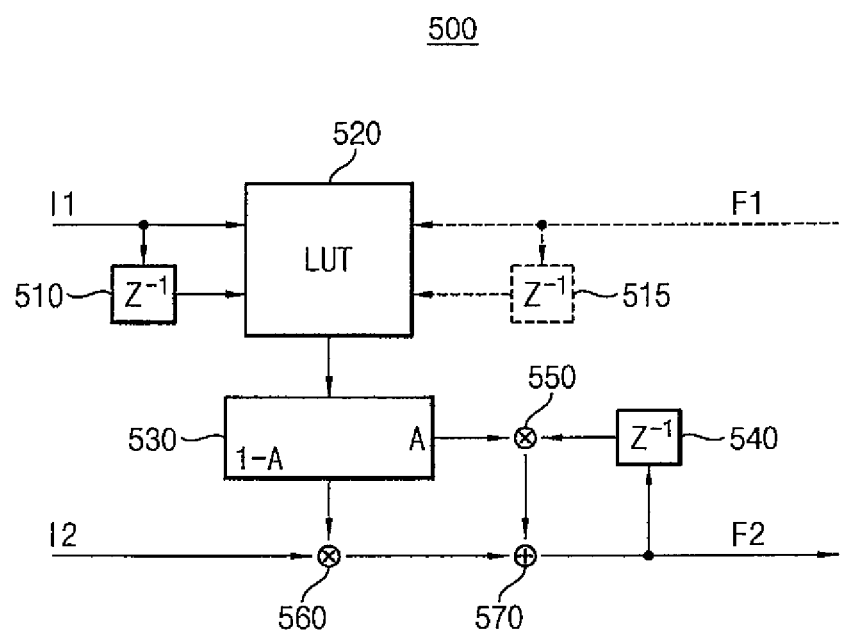
FIG. 5A is a block diagram illustrating an example of a second sensing signal filter included in the touch sensing system of FIG. 1 or the touch sensing system of FIG. 3.
FIG. 5B is a diagram illustrating an example of a look-up table used in the second sensing signal filter of FIG. 5A.

FIG. 5A is a block diagram illustrating an example of a second sensing signal filter included in the touch sensing system of FIG. 1 or the touch sensing system of FIG. 3, and FIG. 5B is a diagram illustrating an example of a look-up table used in the second sensing signal filter of FIG. 5A.

Referring to FIGS. 5A and 5B, in some example embodiments, a second sensing signal filter 500 may include a first delay unit 510, a look-up table (LUT) 520, a weighting outputting unit 530, a second delay unit 540, a first multiplier 550, a second multiplier 560 and an adder 570.

The first delay unit 510 may delay a first sensing signal I1 by one frame. For example, the first delay unit 510 may receive the first sensing signal I1 at an (n−1)-th frame, and may output the first sensing signal I1 of the (n−1)-th frame to the look-up table 520 at an n-th frame.

The look-up table 520 may output a pre-stored filtering coefficient A corresponding to a difference between the first sensing signal I1 received from the pressure detector unit 120 illustrated in FIG. 1 and the first sensing signal I1 received from the first delay unit 510 at the n-th frame. The weighting outputting unit 530 may output the filtering coefficient A to the first multiplier 550, and may output one minus the filtering coefficient A to the second multiplier 560.

The second delay unit 540 may delay a second output signal F2 by one frame. For example, the second delay unit 540 may receive the second output signal F2 at the (n−1)-th frame, and may output the second output signal F2 of the (n−1)-th frame to the first multiplier 550 at the n-th frame.

The first multiplier 550 may multiply the filtering coefficient A and the second output signal F2 received from the second delay unit 540, and may output a result of the multiplication to the adder 570.

The second multiplier 560 may multiply the value (i.e., one minus the filtering coefficient A) received from the weighting outputting unit 530 and a second sensing signal I2 received from the position detector unit 140 illustrated in FIG. 1, and may output a result of the multiplication to the adder 570.

The adder 570 may add the result of the multiplication of the first multiplier 550 and the result of the multiplication of the second multiplier 560, and may output a result of the addition as the second output signal F2.

In other example embodiments, the second sensing signal filter 500 may receive a first output signal F1 instead of the first sensing signal I1, and may include a third delay unit 515 instead of the first delay unit 510.

The third delay unit 515 may delay the first output signal F1 by one frame. For example, the third delay unit 515 may receive the first output signal F1 at an (n−1)-th frame, and may output the first output signal F1 of the (n−1)-th frame to the look-up table 520 at an n-th frame.

The look-up table 520 may output a pre-stored filtering coefficient A corresponding to a difference between the first output signal F1 received from the first sensing signal filter 362 illustrated in FIG. 3 and the first output signal F1 received from the third delay unit 515 at the n-th frame. For example, in a case where the look-up table 520 has values illustrated in FIG. 5B, and the difference between the first output signal F1 of the n-th frame and the first output signal F1 of the (n−1)-th frame is 23, the look-up table 520 may output 0.1 as the filtering coefficient A.

The weighting outputting unit 530 may output the filtering coefficient A to the first multiplier 550, and may output one minus the filtering coefficient A to the second multiplier 560.

The second delay unit 540 may delay a second output signal F2 by one frame. For example, the second delay unit 540 may receive the second output signal F2 at the (n−1)-th frame, and may output the second output signal F2 of the (n−1)-th frame to the first multiplier 550 at the n-th frame.

The first multiplier 550 may multiply the filtering coefficient A and the second output signal F2 received from the second delay unit 540, and may output a result of the multiplication to the adder 570.

The second multiplier 560 may multiply the value (i.e., one minus the filtering coefficient A) received from the weighting outputting unit 530 and a second sensing signal I2 received from the position detector unit 140 illustrated in FIG. 1, and may output a result of the multiplication to the adder 570.

The adder 570 may add the result of the multiplication of the first multiplier 550 and the result of the multiplication of the second multiplier 560, and may output a result of the addition as the second output signal F2.

According to example embodiments, the second sensing signal filter 500 may be implemented with a hardware device, or may be implemented with a software program.

Figure 6A:
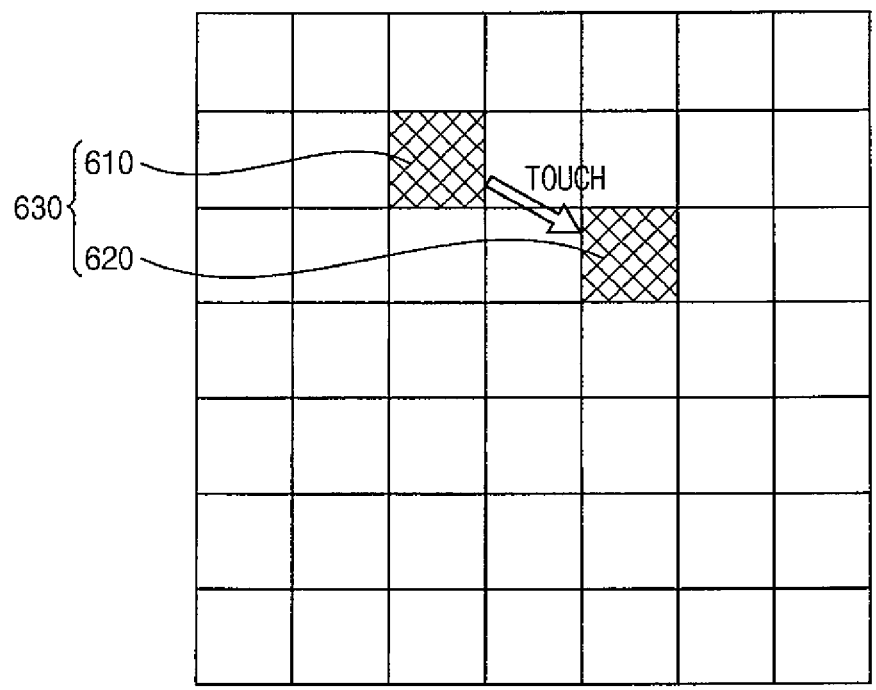
FIG. 6A is a diagram for describing an example of an operation where a noise of a second sensing signal is removed in a case where a user changes a position of a touch input.
Figure 6B:
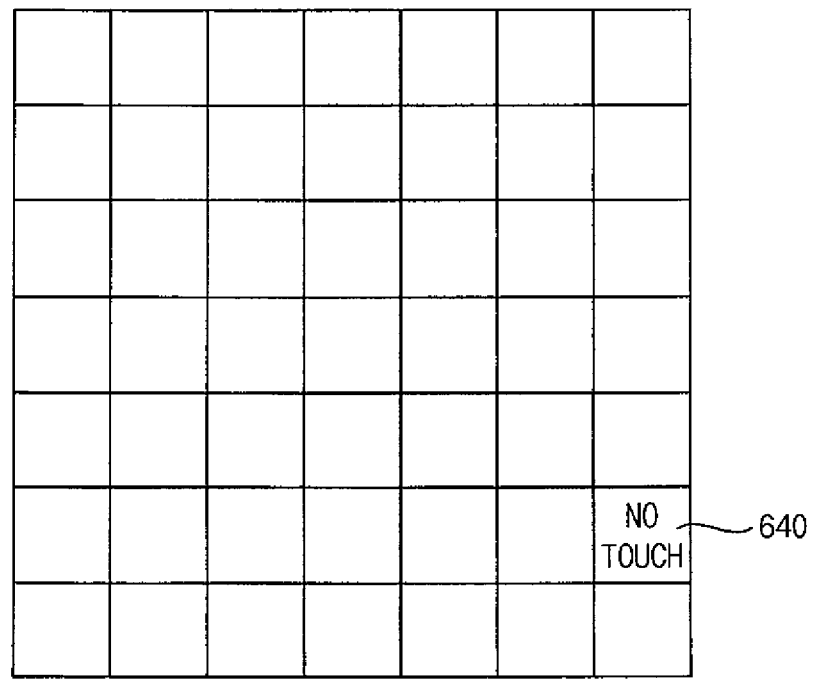
FIG. 6B is a diagram for describing an example of an operation where a noise of a second sensing signal is removed in a case where a user does not change a position of a touch input.

FIG. 6A is a diagram for describing an example of an operation where a noise of a second sensing signal is removed in a case where a user changes a position of a touch input, and FIG. 6B is a diagram for describing an example of an operation where a noise of a second sensing signal is removed in a case where a user does not change a position of a touch input.

Referring to FIG. 6A, when a user provides a touch input of which a position changes from a first touch position 610 to a second touch position 620, a value of a first sensing signal generated by a pressure detector unit may change at the touch positions 610 and 620 in a touch path 630. In particular, the value of the first sensing signal may largely change at the start point 610 and the end point 620 of the touch path 630. Accordingly, filtering coefficients for the touch positions 610 and 620 may decrease based on the large change amount of the first sensing signal for the touch positions 610 and 620, and thus, the touch response speed may increase to immediately respond to the touch input by the user.

Referring to FIG. 6B, when the user does not provide the touch input, or when the user provides the touch input of which the position does not change from a third touch position 640, the value of the first sensing signal may not change at the third touch position 640. Accordingly, a filtering coefficient for the third touch position 640 may increase based on the small change amount of the first sensing signal for the third touch position 640, and thus the effect of the noise is reduced so as to not cause an abnormal operation of a touchscreen.

Figure 7:
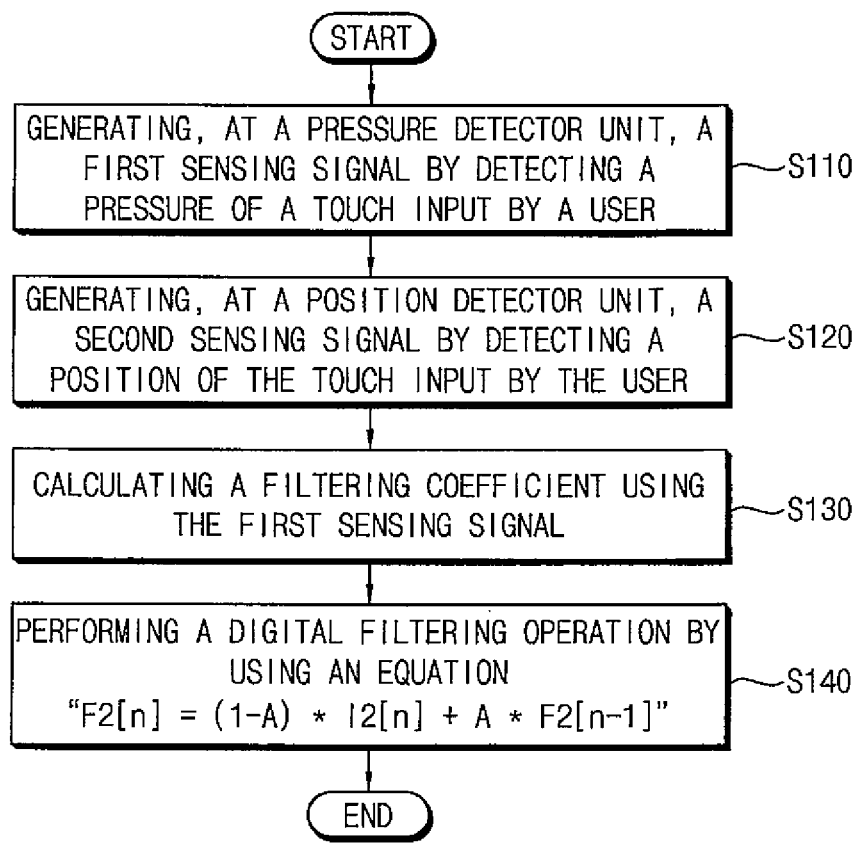
FIG. 7 is a flowchart illustrating a method of sensing a touch in accordance with example embodiments.

FIG. 7 is a flowchart illustrating a method of sensing a touch in accordance with example embodiments.

Referring to FIG. 7, a pressure detector unit may generate a first sensing signal by detecting a pressure of a touch input by a user (S110), and a position detector unit may generate a second sensing signal by detecting a position of the touch input by the user (S120).

A filter unit may calculate a filtering coefficient by using the first sensing signal (S130), and may perform a digital filtering operation to remove a noise from the second sensing signal by using an equation, "F2[n]=(1−A)*I2[n]+A*F2[n−1]" (S140).

As described above, in the method of sensing the touch according to example embodiments, because the digital filtering operation on the second sensing signal is performed based on the filtering coefficient calculated using the first sensing signal, the touch response speed may be increased (or improved) and the effect of the noise may be reduced.

Figure 8:
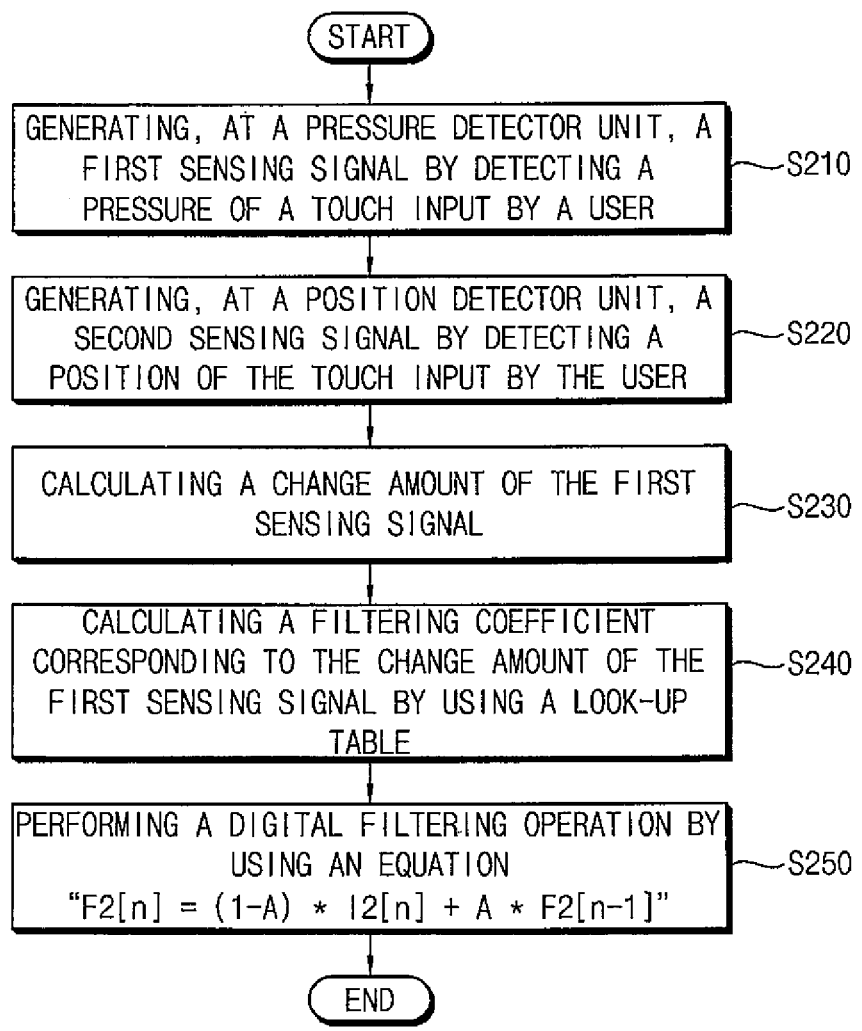
FIG. 8 is a flowchart illustrating a method of sensing a touch in accordance with example embodiments.

FIG. 8 is a flowchart illustrating a method of sensing a touch in accordance with another example embodiment.

Referring to FIG. 8, a pressure detector unit may generate a first sensing signal by detecting a pressure of a touch input by a user (S210), and a position detector unit may generate a second sensing signal by detecting a position of the touch input by the user (S220).

A filter unit may calculate a change amount of the first sensing signal (S230), and may calculate a filtering coefficient by using a look-up table having a plurality of pre-stored filtering coefficients for respective change amounts of the first sensing signal (S240). For example, the filter unit may use, as the filtering coefficient, one of the plurality of pre-stored filtering coefficients corresponding to the change amount of the first sensing signal.

The filter unit may perform a digital filtering operation to remove a noise from the second sensing signal by using an equation, "F2[n]=(1−A)*I2[n]+A*F2[n−1]" (S250).

Figure 9:
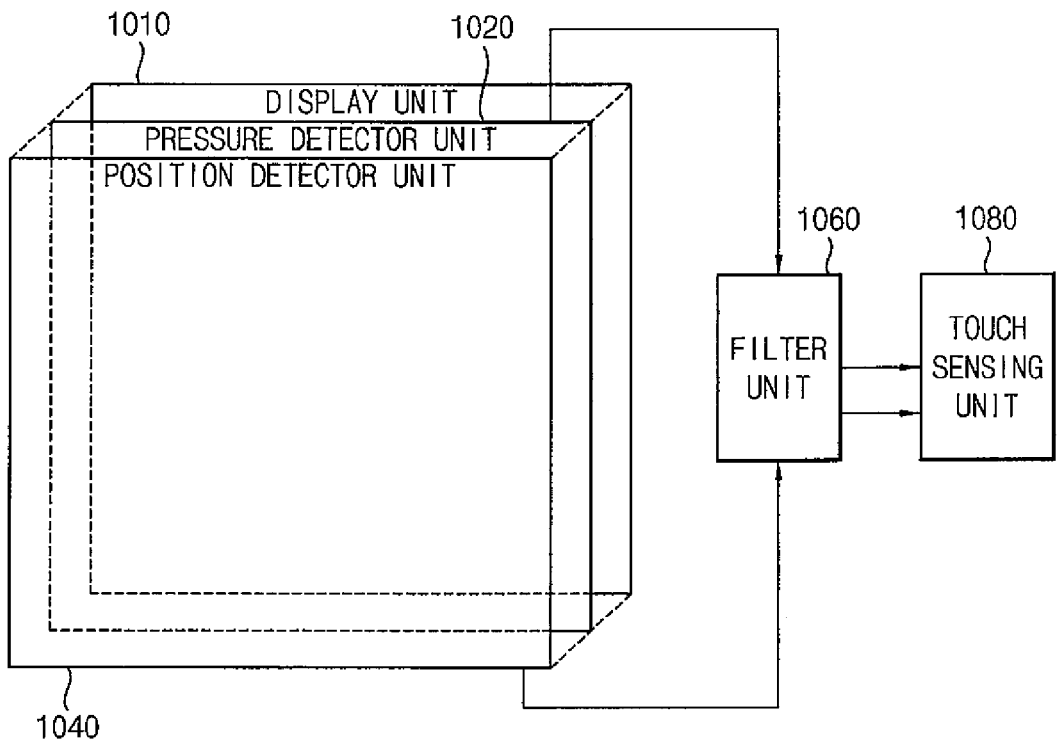
FIG. 9 is a block diagram illustrating a touchscreen including a touch sensing system in accordance with example embodiments.

FIG. 9 is a block diagram illustrating a touchscreen including a touch sensing system in accordance with example embodiments.

Referring to FIG. 9, a touchscreen includes a display unit 1010 and a touch sensing system. The touch sensing system may include a pressure detector unit 1020, a position detector unit 1040, a filter unit 1060 and a touch sensing unit 1080.

The display unit 1010 may display an image. The pressure detector unit 1020 may be located (or disposed) between the display unit 1010 and the position detector unit 1040, and may generate a first sensing signal by detecting a pressure of a touch input by a user. The position detector unit 1040 may generate a second sensing signal by detecting a position of the touch input by the user.

The filter unit 1060 may receive the first and second sensing signals from the pressure detector unit 1020 and the position detector unit 1040. The filter unit 1060 may remove noise from the first and second sensing signals. The touch sensing unit 1080 may receive the first and second sensing signals from the filter unit 1060 where the noise is removed by the filter unit 1060, and may determine the position of the touch input based on the received first and second sensing signals.

Figure 10:
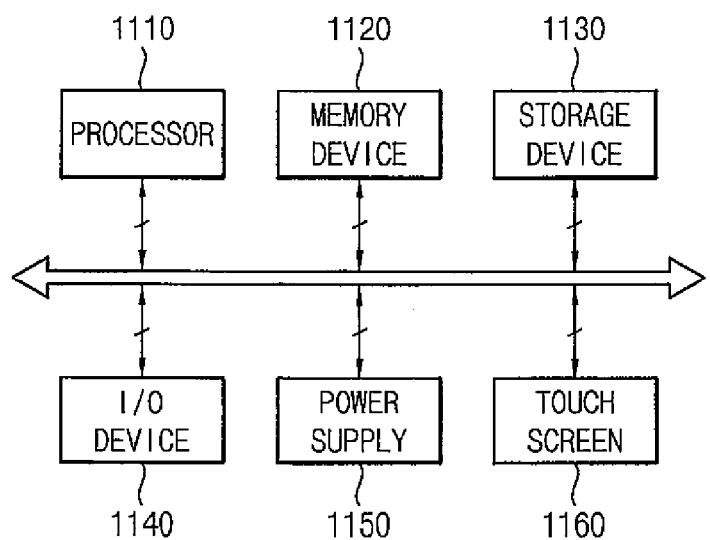
FIG. 10 is a block diagram illustrating an electronic system including a touchscreen in accordance with example embodiments.

FIG. 10 is a block diagram illustrating an electronic system including a touchscreen in accordance with example embodiments.

Referring to FIG. 10, an electronic system 1100 includes a processor 1110, a memory device (or memory) 1120, a storage device (or storage) 1130, an input/output (I/O) device 1140, a power supply 1150, and a touchscreen 1160. The touchscreen 1160 may include a touch sensing system. In some example embodiments, the electronic system 1100 may further include a plurality of ports for communicating with a video card, a sound card, a memory card, a universal serial bus (USB) device, other electronic systems, etc.

The processor 1110 may perform various computing functions or tasks. The processor 1110 may be for example, a microprocessor, a central processing unit (CPU), etc. The processor 1110 may be connected to other components via an address bus, a control bus, a data bus, etc. Further, the processor 1110 may be coupled to an extended bus such as a peripheral component interconnection (PCI) bus. The memory device 1120 may store data for operations of the electronic system 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc. The storage device 1130 may be, for example, a solid state drive (SSD) device, a hard disk drive (HDD) device, a CD-ROM device, etc. The I/O device 1140 may be, for example, an input device such as a keyboard, a keypad, a mouse, etc., and/or an output device such as a printer, a speaker, etc. The power supply 1150 may supply power for operations of the electronic system 1100.

The touch sensing system included in the touchscreen 1160 may determine whether a change of a second sensing signal generated by a position detector unit is caused by a touch input of a user or by a noise using a first sensing signal generated by a pressure detector unit that is insusceptible to the noise, and may adaptively adjust weightings of a current sensing signal (e.g., at an n-th frame) and a previous sensing signal (e.g., at an (n−1)-th frame) for the second sensing signal. Accordingly, the touch response speed of the touchscreen 1160 may be increased (or improved) and the effect of the noise of the touchscreen 1160 may be reduced.

The present embodiments may be applied to any electronic system 1100 having a touchscreen. For example, the present embodiments may be applied to the electronic system 1100, such as a television, a computer monitor, a laptop, a digital camera, a cellular phone, a smart phone, a personal digital assistant (PDA), a portable multimedia player (PMP), an MP3 player, a navigation system, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and aspects of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method of sensing a touch, the method comprising:
generating, at a pressure detector, a pressure sensing signal by detecting a pressure of a touch input by a user;
generating, at a position detector separate from the pressure detector, a position sensing signal by detecting a position of the touch input by the user; and
removing a noise of the position sensing signal based on the pressure sensing signal.

2. The method of claim 1, wherein the removing the noise of the position sensing signal comprises:
performing a digital filtering operation on the position sensing signal using the pressure sensing signal.

3. The method of claim 2, wherein the performing the digital filtering operation on the position sensing signal comprises:
calculating a filtering coefficient using the pressure sensing signal; and
performing the digital filtering operation on the position sensing signal using the filtering coefficient.

4. The method of claim 2,
wherein the performing the digital filtering operation on the position sensing signal is performed according to the following equation:

$$F2[n]=(1-A)*I2[n]+A*F2[n-1],$$

wherein F2[n] is the position sensing signal of an n-th frame after the digital filtering operation on the position sensing signal of the n-th frame is performed, I2[n] is the position sensing signal of the n-th frame before the digital filtering operation on the position sensing signal of the n-th frame is performed, F2[n−1] is the position sensing signal of an (n−1)-th frame after the digital filtering operation on the position sensing signal of the (n−1)-th frame is performed, and A is a filtering coefficient.

5. The method of claim 4, wherein the filtering coefficient decreases as a change amount of the pressure sensing signal increases.

6. The method of claim 4, wherein the filtering coefficient is calculated according to the following equation:

$$A=A0+A1*|I1[n-1]-I1[n]|,$$

wherein A0 is a first constant, A1 is a second negative constant, I1[n−1] is the pressure sensing signal of the (n−1)-th frame, and I1[n] is the pressure sensing signal of the n-th frame.

7. The method of claim 4, wherein the filtering coefficient is calculated according to the following equation:

$$A=A0+A1*|F1[n-1]-F1[n]|,$$

wherein A0 is a first constant, A1 is a second negative constant, F1[n−1] is the pressure sensing signal of the (n−1)-th frame after a digital filtering operation on the pressure sensing signal of the (n−1)-th frame is performed, and F1[n] is the pressure sensing signal of the n-th frame after the digital filtering operation on the pressure sensing signal of the n-th frame is performed.

8. The method of claim 4, wherein the filtering coefficient is calculated using a look-up table having a plurality of pre-stored filtering coefficients for respective change amounts of the pressure sensing signal.

9. A non-transitory computer-readable recording medium having embodied thereon a computer program to execute a method of sensing a touch, the method comprising:
- generating, at a pressure detector, a pressure sensing signal by detecting a pressure of a touch input by a user;
- generating, at a position detector separate from the pressure detector, a position sensing signal by detecting a position of the touch input by the user; and
- removing a noise of the position sensing signal based on the pressure sensing signal.

10. The recording medium of claim 9,
wherein a digital filtering operation on the position sensing signal is performed according to the following equation:

$$F2[n]=(1-A)*I2[n]+A*F2[n-1],$$

wherein F2[n] is the position sensing signal of an n-th frame after the digital filtering operation on the position sensing signal of the n-th frame is performed, I2[n] is the position sensing signal of the n-th frame before the digital filtering operation on the position sensing signal of the n-th frame is performed, F2[n−1] is the position sensing signal of an (n−1)-th frame after the digital filtering operation on the position sensing signal of the (n−1)-th frame is performed, and A is a filtering coefficient, and wherein the filtering coefficient is calculated using the pressure sensing signal.

11. The recording medium of claim 10, wherein the filtering coefficient decreases as a change amount of the pressure sensing signal increases.

12. The recording medium of claim 10, wherein the filtering coefficient is calculated according to the following equation:

$$A=A0+A1*|I1[n-1]-I1[n]|,$$

wherein A0 is a first constant, A1 is a second negative constant, I1[n−1] is the pressure sensing signal of the (n−1)-th frame, and I1[n] is the pressure sensing signal of the n-th frame.

13. A touch sensing system comprising:
- a pressure detector configured to detect a pressure of a touch input by a user and to generate a pressure sensing signal;
- a position detector separate from the pressure detector and configured to detect a position of the touch input by the user and to generate a position sensing signal; and
- a filter configured to remove a noise of the position sensing signal based on the pressure sensing signal.

14. The touch sensing system of claim 13, wherein the filter is configured to perform a digital filtering operation on the position sensing signal by using the pressure sensing signal.

15. The touch sensing system of claim 14, wherein the filter is configured to calculate a filtering coefficient using the pressure sensing signal, and to perform the digital filtering operation on the position sensing signal by using the filtering coefficient.

16. The touch sensing system of claim 14,
wherein the filter is configured to perform the digital filtering operation on the position sensing signal according to the following equation:

$$F2[n]=(1-A)*I2[n]+A*F2[n-1],$$

wherein F2[n] is the position sensing signal of an n-th frame after the digital filtering operation on the position sensing signal of the n-th frame is performed, I2[n] is the position sensing signal of the n-th frame before the digital filtering operation on the position sensing signal of the n-th frame is performed, F2[n−1] is the position sensing signal of an (n−1)-th frame after the digital filtering operation on the position sensing signal of the (n−1)-th frame is performed, and A is a filtering coefficient.

17. The touch sensing system of claim 16, wherein the filtering coefficient decreases as a change amount of the pressure sensing signal increases.

18. The touch sensing system of claim 16, wherein the filter is configured to calculate the filtering coefficient according to the following equation:

$$A=A0+A1*|I1[n-1]-I1[n]|,$$

wherein A0 is a first constant, A1 is a second negative constant, I1[n−1] is the first pressure sensing signal of the (n−1)-th frame, and I1[n] is the pressure sensing signal of the n-th frame.

19. The touch sensing system of claim 16, wherein the filter is configured to calculate the filtering coefficient according to the following equation:

$$A=A0+A1*|F1[n-1]-F1[n]|,$$

wherein A0 is a first constant, A1 is a second negative constant, F1[n−1] is the pressure sensing signal of the (n−1)-th frame after a digital filtering operation on the pressure sensing signal of the (n−1)-th frame is performed, and F1[n] is the pressure sensing signal of the n-th frame after the digital filtering operation on the pressure sensing signal of the n-th frame is performed.

20. The touch sensing system of claim 16, wherein the filter includes a look-up table having a plurality of pre-stored filtering coefficients for respective change amounts of the pressure sensing signal, and the filter is configured to use one of the plurality of pre-stored filtering coefficients in the look-up table.

* * * * *